(12) United States Patent
Schulz et al.

(10) Patent No.: US 7,540,420 B2
(45) Date of Patent: *Jun. 2, 2009

(54) CENTRALIZED MANAGEMENT OF REPLACEMENT VEHICLE LABELS

(75) Inventors: Mark F. Schulz, Lake Elmo, MN (US); Jeffrey R. Janssen, Woodbury, MN (US); John E. Gozum, Stillwater, MN (US); Gary L. Asmus, Hudson, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 135 days.

This patent is subject to a terminal disclaimer.

(21) Appl. No.: 11/866,188

(22) Filed: Oct. 2, 2007

(65) Prior Publication Data

US 2008/0017701 A1 Jan. 24, 2008

Related U.S. Application Data

(63) Continuation of application No. 11/126,539, filed on May 11, 2005, now Pat. No. 7,293,706.

(51) Int. Cl.
*G06F 17/60* (2006.01)

(52) U.S. Cl. ...................... 235/385; 235/382

(58) Field of Classification Search ................ 235/385, 235/382

See application file for complete search history.

(56) References Cited

U.S. PATENT DOCUMENTS

| | | | |
|---|---|---|---|
| 3,579,798 A | 5/1971 | Henderson | |
| 5,319,562 A | 6/1994 | Whitehouse | |
| 5,715,403 A | 2/1998 | Stefik | |
| 6,406,787 B1 | 6/2002 | Rajan et al. | |
| 6,442,460 B1 * | 8/2002 | Larson et al. | 701/33 |
| 6,535,294 B1 | 3/2003 | Arledge, Jr. et al. | |
| 7,079,033 B2 * | 7/2006 | Itou | 340/572.3 |
| 7,293,706 B2 * | 11/2007 | Schulz et al. | 235/385 |
| 2001/0027419 A1 | 10/2001 | Sands | |
| 2002/0004756 A1 | 1/2002 | Umehara | |
| 2002/0023057 A1 | 2/2002 | Goodwin et al. | |
| 2002/0152093 A1 | 10/2002 | Chalmers et al. | |
| 2003/0004946 A1 | 1/2003 | Van Den Avond et al. | |
| 2003/0055812 A1 | 3/2003 | Williams et al. | |
| 2003/0061217 A1 | 3/2003 | Whittingham et al. | |

(Continued)

FOREIGN PATENT DOCUMENTS

GB 2 352 678 A 2/2001

(Continued)

*Primary Examiner*—Daniel St.Cyr
(74) *Attorney, Agent, or Firm*—Steven A. Bern

(57) ABSTRACT

A central labeling data (CLD) management system provides centralized management, assembly, and distribution of labeling data for use in generating replacement labels for damaged vehicles. For example, the CLD management system includes a database that stores label data for a plurality of vehicles produced by a plurality of different manufacturers. The CLD management system presents an interface to receive an electronic communication from a client computing device associated with a repair shop. The electronic communication includes a request for label data associated with an original vehicle label. The CLD management system retrieves the requested label data from the database and communicates the label data to an output device for printing a new vehicle label for use by the repair shop.

25 Claims, 7 Drawing Sheets

U.S. PATENT DOCUMENTS

| | | |
|---|---|---|
| 2003/0069809 A1 | 4/2003 | von Rosen et al. |
| 2004/0015404 A1 | 1/2004 | McCarthy |
| 2004/0039646 A1 | 2/2004 | Hacker |
| 2004/0054659 A1 | 3/2004 | McIntyre |
| 2004/0225528 A1 | 11/2004 | Brock |

FOREIGN PATENT DOCUMENTS

| | | |
|---|---|---|
| WO | WO 01/22317 A2 | 3/2001 |

* cited by examiner

*FIG. 7*

| TIRE SIZE | LOAD RANGE | PRESSURE | |
|---|---|---|---|
| | | FRONT — | REAR — |
| P185/65R14<br>P185/60R15 | STD | 221 kPa<br>32 PSI | 241 kPa<br>35 PSI |
| T115/70D14 | T | 415 kPa<br>60 PSI | 415 kPa<br>60 PSI |

RECOMMENDED TIRE SIZE AND INFLATION PRESSURE (COLD) — B

CENTRALIZED MANAGEMENT OF REPLACEMENT VEHICLE LABELS

CROSS REFERENCE TO RELATED APPLICATION

This application is a continuation of U.S. Ser. No. 11/126,539, filed May 11, 2005, now U.S. Pat. No. 7,293,706, the disclosure of which is incorporated by reference in its entirety herein.

TECHNICAL FIELD

The invention generally relates to vehicular technologies and, more particularly, managing labeling and other printed material for vehicle repair.

BACKGROUND

Each year collision repair centers restore thousands of damaged automobiles and other vehicles. One challenge for a repair center when restoring a vehicle is obtaining appropriate replacement labels for the damaged parts that need to be repaired or replaced. Example replacement labels include emissions labels, belt routing labels, warning labels, information labels, and, potentially, anti-theft labels affixed to the damaged parts by the original vehicle manufacturer.

Unfortunately, the labels are typically located in areas that are often damaged in an accident. For example, when manufactured, an automotive vehicle often includes labels at particular locations under the hood, on the radiator core supports, inside the door and door jamb, within the engine compartment, inside the fuel filler door, inside the trunk area and within the vehicle interior.

One reason the labels are often difficult to obtain is that the labels are often specific to the particular make, model and features of the damaged vehicle. Further, the labels may include detailed information as the date, time and plant where the vehicle was produced, particular body colors, engine type, vehicle identification number (VIN) and other information. As a result, the repair center is typically forced to order the labels directly from the dealerships and parts networks associated with the manufacturer of the particular vehicle being repaired.

Frequently, the time required to obtain the labels exceeds the customer's or insurance company's expectations. In many cases, the repair center has completed the repair of a vehicle and delivered the vehicle to the customer before the labels arrive from the vehicle manufacturer. As a result, the customer is forced to either return with the vehicle or forego the labels altogether. This may give rise to a number of undesirable results, such as diminished value of the vehicle, safety risks due to the missing labels and inconvenience during maintenance or repair.

SUMMARY

In general, the invention is directed to techniques for centralized management, organization and secure distribution of labeling data for use in generating replacement labels for damaged vehicles. A system is described in which a computer-implemented system provides centralized access to labeling data for a plurality of vehicle manufacturers. The system, referred to herein as the centralized labeling data (CLD) management system, provides a computing environment with which repair shops and other customers communicate to efficiently obtain replacement labels for vehicles from different manufacturers. The customers or client software at the repair center communicates with the CLD management system to determine the appropriate, vehicle-specific replacement labels, and may download and print the labels as needed. In this manner, the system allows the customers to quickly obtain the particular labels needed for the vehicle being repaired.

In one embodiment, a method comprises receiving an electronic communication from a client computing device associated with a repair shop, wherein the electronic communication includes a request for label data associated with an original vehicle label. The method further comprises retrieving the requested label data from a database that stores label data for a plurality of vehicles produced by different manufacturers, and electronically communicating the label data to an output device for printing a new vehicle label for use by the repair shop.

In another embodiment, a method comprises receiving an electronic communication from a client computing device associated with a repair shop, wherein the electronic communication includes a request for label data associated with an original vehicle label. The method further includes automatically processing the request with a label management system to identify a vehicle manufacturer associated with the original vehicle label, wherein the label management system stores information for a plurality of vehicles produced by a plurality of different vehicle manufacturers. In addition, the method includes issuing electronic communications from the label management system to a data system associated with the identified vehicle manufacturer to retrieve the label data associated with the original vehicle label, and electronically communicating the retrieved label data to an output device for printing a new vehicle label for use by the repair shop.

In another embodiment, a system includes a database and a computing system. The database stores label data for a plurality of vehicles produced by a plurality of different manufacturers. The computing system executes software that presents an interface to receive an electronic communication from a client computing device associated with a repair shop, wherein the electronic communication includes a request for label data associated with an original vehicle label. Further, the computer system executes software that retrieves the requested label data from the database and communicates the label data for printing a new vehicle label on an output device for use by the repair shop.

In another embodiment, a system comprises a computer associated with a repair shop. The computer executes software that presents an interface for receiving information specifying a part for use during repair of a vehicle. The software automatically prompts a user to order labels based on the specified parts.

In another embodiment, an online label data management system comprises means for centrally storing label data for a plurality of vehicles produced by different manufacturers, and means for processing a request for label data associated with an original vehicle label. The system further includes means for electronically communicating the label data for printing a new vehicle label based on the original vehicle label.

In another embodiment, the invention is directed to an article, i.e., a vehicle label reprinted from label data associated with an original vehicle label. The reprinted vehicle label includes tracking data that includes an identifier of a vehicle repair shop for which the label was reprinted.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 5-7 illustrate example vehicle labels that may be reprinted from the CLD management system.

DETAILED DESCRIPTION

Figure 1:
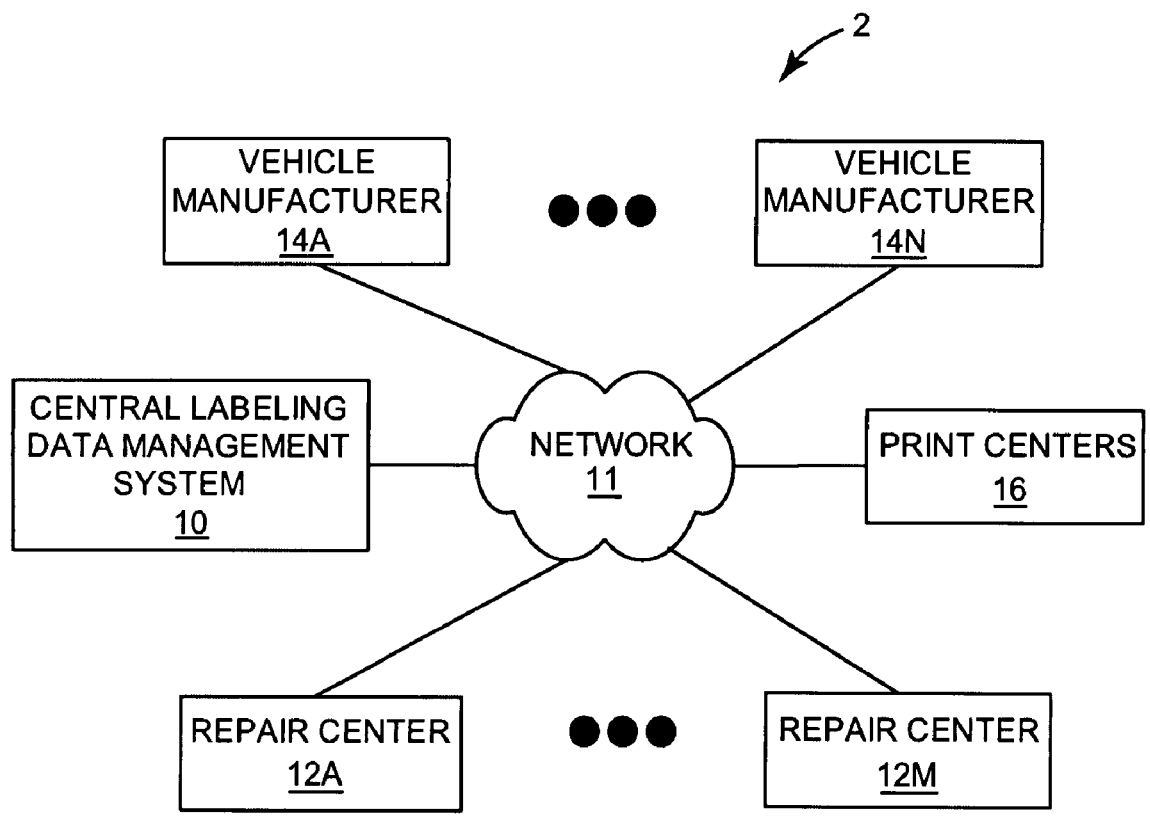
FIG. 1 is a block diagram illustrating an example computing environment in which a centralized labeling data (CLD) management system provides access to vehicular label data for a plurality of vehicle manufactures.

FIG. 1 is a block diagram illustrating a computing environment 2 in which a centralized labeling data (CLD) management system 10 provides centralized access to labeling data for a plurality of vehicle manufacturers 14A-14N. In general, CLD 10 provides a computing environment with which repair shops 12A-12M and other customers interact to efficiently obtain replacement labels for vehicles produced by different vehicle manufacturers 14.

Repair centers 12 may include any organization engaged in the repair or restoration of vehicles, such as automotives, trains, buses, planes, watercraft, snowmobiles, jet skis, all-terrain vehicles, motorcycles and other vehicles. Moreover, CLD management system 10 may support repair centers 12 of all sizes ranging from sole proprietorships to large national or international franchises. Vehicle manufacturers 14 represent any entity that manufactures vehicles or otherwise maintains specific label information for manufactured vehicles.

Authorized users or automated client software associated with repair centers 12 securely interact with CLD management system 10 to select the appropriate replacement labels. More specifically, authorized users associated with repair centers 12 interact with CLD management system 10 via network 11 to view and order the labels or other printed material for application to a repaired vehicle. A user can be any authorized individual, such as a service representative, technician, estimator or repair specialist.

Each user typically interacts with a client computing device suitable for communication with CLD management system 10 via network 11. For example, a user may use a workstation, personal computer, laptop computer, or even a web-enabled cell phone or personal digital assistant (PDA) such as a Palm™ organizer from Palm Inc. of Santa Clara, Calif., or a Windows™ CE device. The communication device may execute communication software, such as a web browser such as Internet Explorer™ from Microsoft Corporation of Redmond, Wash., in order to communicate with CLD management system 10. Communications between CLD management system 10 and the other devices of computing environment 2 may take the form of encrypted, secure communications. For example, the communications may be encrypted using the Secure Sockets Layer (SSL), Secure HTTP (S-HTTP) or IP Security (IPSec) network protocols.

By communicating with CLD management system 10, repair centers 12 can securely obtain replacement labels without separately interacting each of vehicle manufacturers 14. In this manner, CLD management system 10 may eliminate redundancies and inefficiencies inherent to a decentralized process. This may allow repair centers 12 to better obtain replacement labels in a timely manner. For example, CLD management system 10 supports and facilitates "on-demand" print systems by streamlining the delivery of labeling data directly to repair centers 12 and print centers 16 when needed. In other words, vehicle-specific labeling data can be quickly distributed to print output devices based on the current needs of each repair center 12, thereby allowing the repair centers to accelerate the completion of a repair and the satisfaction of the customer. Although referred to herein generally as vehicle labels, the term "label" includes labels printed on conventional label stock of suitable durability, stamped metal plates to be affixed to a vehicle part, laser engraved information to be etched on a metal substrate, holographic information formed on a substrate or any other form of information-conveying medium by the original vehicle manufacturer to be affixed to a vehicle part.

By communicating with CLD management system 10, repair centers 12 and print centers 16 can easily regenerate vehicle labels in conformance with requirements from a variety of diverse entities, including vehicle manufacturers 14 and regulatory agencies. In other words, CLD management system 10 provides a centralized, intelligent system for ensuring that replacement labels used on the repaired vehicles comply with the specific requirements set forth by vehicle manufacturers 14 and regulatory agencies.

CLD management system 10 may also support a variety of features for application of business rules and other constraints to automate the retrieval, regeneration and validation of the replacement vehicle labels. A label management rules engine within CLD management system 10 controls the regeneration of the selected labels in view of the rules specified by a service provider of CLD management system 10 and any specific requirements defined by vehicle manufacturers 14. In this manner, CLD management system 10 provides an intelligent warehouse with which repair centers 12 and vehicle manufacturers 14 interact for storage, validation, and redistribution of labels for use when repairing vehicles.

Repair centers 12 may elect to download and locally print the labels as needed. For example, repair centers 12 may include one or more label printers capable of printing high-quality labels or general-purpose printers such as ink jet and laser printers. This may be advantageous in that repair centers 12 are able to print replacement labels "on-demand," i.e., as needed, for the particular vehicles currently being repaired.

Alternatively, a repair center 12 or CLD management system 10 may direct the selected replacement labels to one of print centers 16. Further, CLD management system may have on-site or remote print capabilities for printing and shipping the replacement labels directly to repair centers 12. Consequently, repair centers 12 need not necessarily have print capabilities on site.

In one embodiment, CLD management system 10 includes one or more data servers for hosting the labeling data received from vehicle manufacturers 14. Examples of such data may include graphic images, statements of compliance with regulations, translations, warnings, complete images of the labels, thumbnails or other reduced images of the labels, or other label data. CLD management system 10 securely organizes the label data to ensure that the label data for a given one of vehicle manufacturers 14 is not accessible by any other vehicle manufacturer.

In another embodiment, CLD management system 10 does not host complete label information for vehicle manufacturers 14. Rather, CLD management system 10 stores data that indexes and describes the labels available from vehicle manufacturers 14. Upon selection of one or more labels by a user, CLD management system 10 retrieves the complete label data from the appropriate vehicle manufacturers 14 via network 11, and delivers the label data for printing the actual replacement labels. In this manner, vehicle manufacturers 14 maintain and control actual label data in a distributed manner. Nevertheless, CLD management system 10 provides a unified interface for seamlessly selecting and obtaining replacement labels from vehicle manufacturers 14.

The service provider of CLD management system 10 may charge repair centers 12 and/or vehicle manufacturers 14 fees for use of the label data management services. The service provider of CLD management system 10 may, for example, charge vehicle manufacturers 14 data warehouse fees based on the number or volume of stored labeling records, graphics, or any combination thereof. The service provider of CLD management system 10 may also charge repair centers 12 fees based on the number of accesses by authorized users within the repair centers.

In addition, the service provider CLD management system 10 may charge subscription service fees or fees based on the number of labels printed. Alternatively, CLD management system 10 may be offered as a value-add service provided with other services or labeling materials. For example, services provided by CLD management system 10 may be offered to repair centers 12 in conjunction with the sale of labeling material or other material, such as automotive tape or adhesive. Further, a fee sharing relationship may be utilized between the service provider of CLD management system 10 and vehicle manufacturers 14 in which a portion of fees received from repair centers 12 are shared between the service provider and the vehicle manufacturers.

In some instances, CLD management system 10 may replicate and distribute all or selected portions of the aggregated label data. For example, CLD management system 10 may distribute the label data to repair centers 12 via a medium, such as a CD or DVD or network 11.

Figure 2:
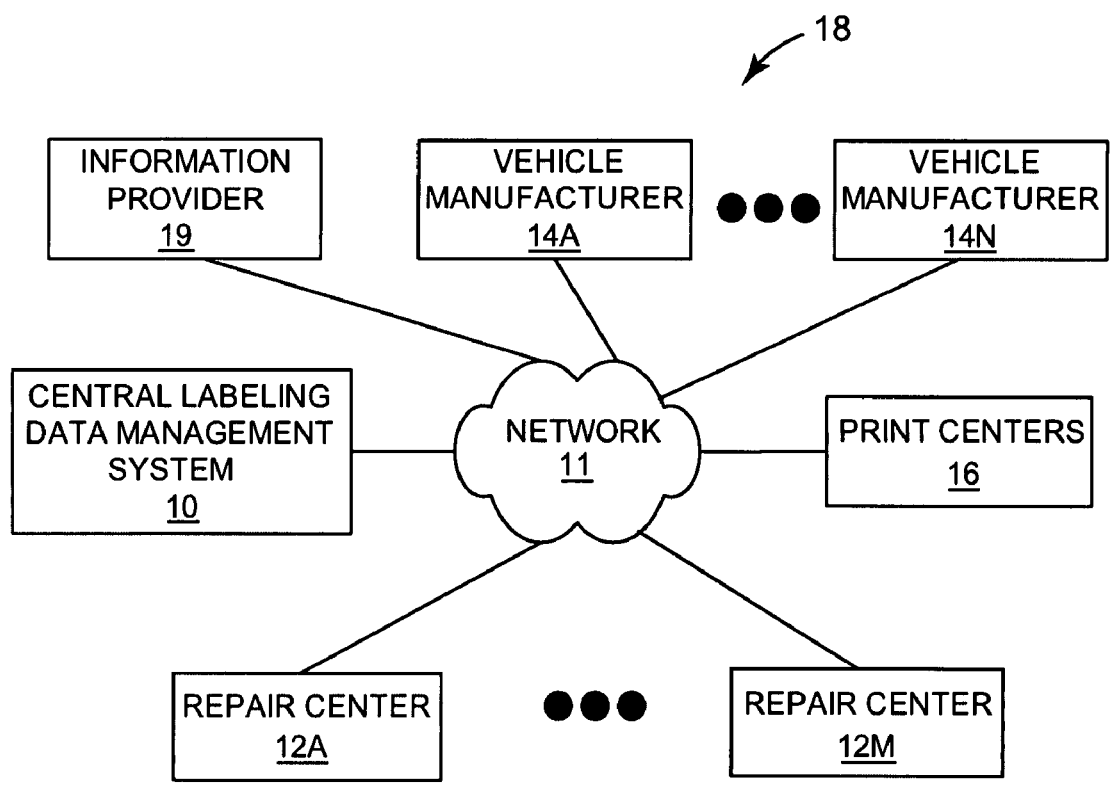
FIG. 2 is a block diagram illustrating another example computing environment having a CLD management system.

FIG. 2 is a block diagram illustrating another exemplary computing environment 18 that substantially conforms with the computing environment 2 of FIG. 1. However, in this example, CLD management system 10 communicates with an external information provider 19 that provides automotive repair and estimating information.

In particular, in this example, authorized users within repair centers 12 interact with estimating software, shop management software, part-ordering software or other software that executes on client computing devices within the repair centers. One example of estimating software includes On Demand™ estimating software from the Mitchell Repair Information Division of Mitchell International. Other examples of information providers that provide software and repair information for the automotive industry include CCC Information Services Inc., MOTOR Information Systems, Thatcham and Automatic Data Processing (ADP), Inc.

In this embodiment, the client software executing within repair centers 12 includes additional functionality that seamlessly and transparently accesses with CLD management system 10 and/or information provider 19. For example, the client software may present a user interface that allows a user to create an estimate or part order for a repair and, in particular, select the necessary replacement labels from CLD management system 10. The client software transparently accesses CLD management system 10 directly or indirectly through information provider 19 based on the created estimate or part order. For example, the client software may automatically prompt the user to order the necessary replacement labels based on the particular vehicle being repaired and the specific parts identified within the estimate or part order. For example, the client software may automatically identify and prompt the user to include labels for the underside of the hood for the specific vehicle under repair when the service representative lists the hood within the current repair estimate or part order. The client software may query CLD management system 10 or information provider 19 to determine which labels are necessary for each damaged part listed by the user and to automatically identify the relevant part numbers for the labels.

In this arrangement, a fee sharing relationship may be utilized between the service provider of CLD management system 10, vehicle manufacturers 14 and information provider 19 in which a portion of fees receives from repair centers 12 are shared between the service provider, the vehicle manufacturers and the information provider.

Figure 3:
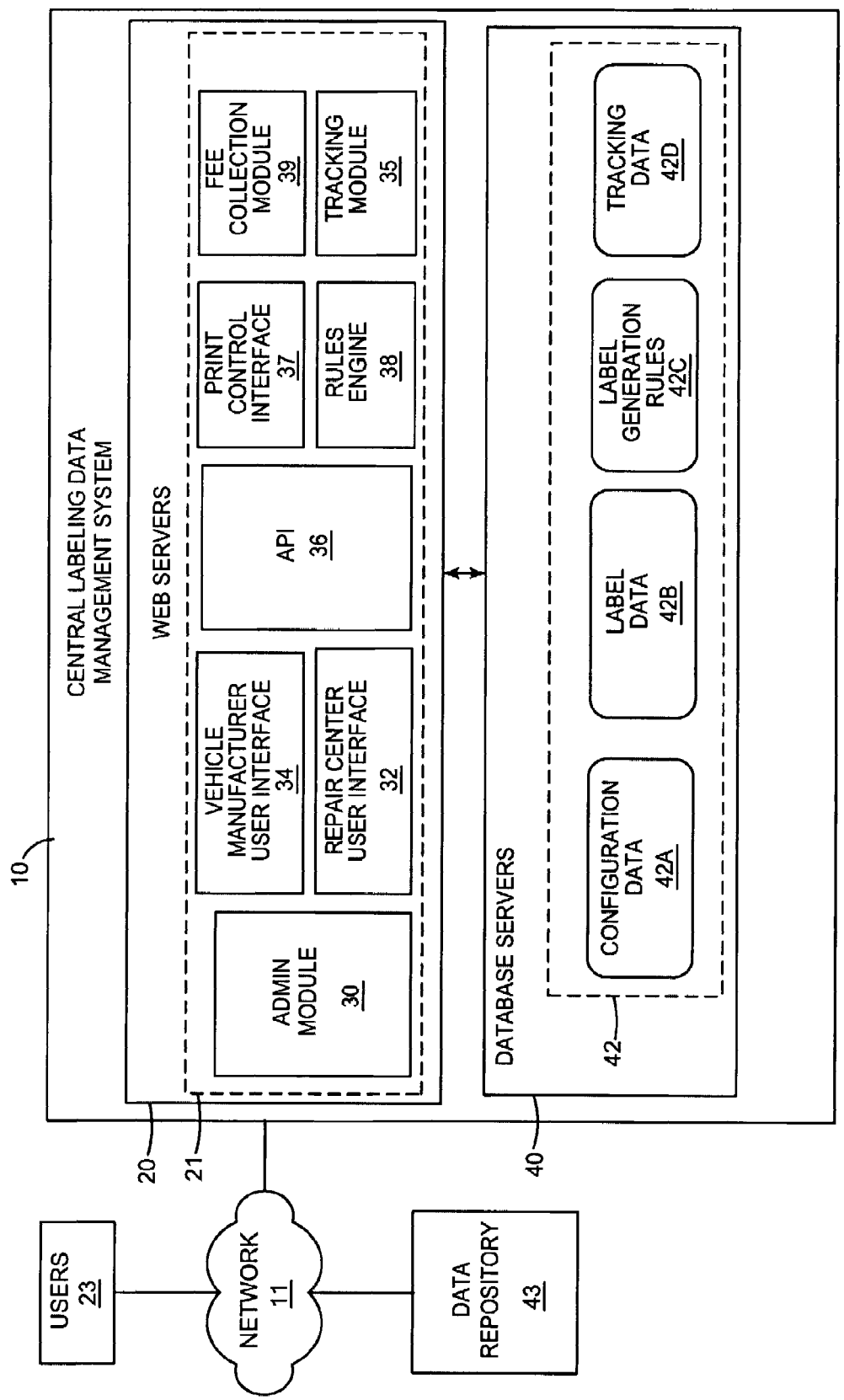
FIG. 3 is a block diagram illustrating an example embodiment of the CLD management systems of FIGS. 1 and 2.

FIG. 3 is a block diagram illustrating an example embodiment of CLD management system 10 with which repair centers 12 communicate to select and print replacement labels for vehicles associated with a wide variety of vehicle manufacturers 14.

In this example, web servers 20 provide an interface by which authorized users 23 of repair centers 12, vehicle manufacturers 14, and print centers 16 communicate with CLD management system 10 via network 11. In one configuration, web servers 20 execute web server software, such as Internet Information Server™ from Microsoft Corporation, of Redmond, Wash. As such, web servers 20 provide an environment for interacting with users 23 according to software modules 21, which can include Active Server Pages, web pages written in hypertext markup language (HTML) or dynamic HTML, Active X modules, Lotus scripts, Java scripts, Java Applets, Distributed Component Object Modules (DCOM) and the like.

Although illustrated as "server side" software modules executing within an operating environment provided by web servers 20, software modules 21 could readily be implemented as "client-side" software modules executing on remote client computing devices associated with users 23. Software modules 21 could be, for example, implemented as Active X modules executed by web browsers executing on the computing devices. Moreover, although illustrated for exemplary purposes as executing on web servers 20, software modules 21 may alternatively execute on one or more application servers within CLD management system 10. Further, software modules 21 may interact with estimating software, shop management software, part ordering software or other client-side software executing within repair centers 12 to seamlessly and transparently provide label data for reprinting vehicle labels.

In this example, software modules 21 may include a number of modules, including administration (Admin) module 30, repair center user interface 32, vehicle manufacturer user interface 34, tracking module 35, application programming interface (API) 36, print control interface 37, rules engine 38 and fee collection module 39. Software modules 21 are stored on a computer-readable medium (e.g., memory or a disk).

Software modules 21 interact with one or more database servers 40 to access and maintain data 42, which may include configuration (config) data 42A, label data 42B, label generation rules 42C and tracking data 42D. Data 42 may be stored in a variety of forms including data storage files, one or more database management systems (DBMS) executing on one or more database servers 40, or combinations thereof. The database management systems may be a relational (RDBMS), hierarchical (HDBMS), multidimensional (MDBMS), object oriented (ODBMS or OODBMS) or object relational (OR- DBMS) database management system. Data 42 could, for example, be stored within a single relational database such as SQL Server from Microsoft Corporation.

Administration (admin) module 30 presents an interface by which some users, such as system administrators, are able to configure CLD management system 10. A system administrator may, for example, manage accounts for repair centers 12, vehicle manufacturers 14 and print centers 16, including setting access privileges and defining a number of corporate and user preferences. Examples of corporate preferences include preferred language translations (e.g., source and target languages), signature lines, suggested label stock. Examples of user preferences include authorized printers for each user, as well as user access rights. Admin module 30 allows the system administrator to define access rights for individual users to control the access to the appropriate portions of label data 42B. In this manner, individual users 23 cannot access label data associated with vehicle manufacturers 14 for which the particular user or repair center is not authorized.

Admin module 30 stores configuration data 42A within database servers 40. Configuration data 42A represents the configuration data provided by the system administrators including, for example, account data specifying authorized users associated with repair centers 12, vehicle manufacturers 14, and print centers 16. In addition, configuration data 42A may include data specifying user and customer preferences, preferred output stock (substrates) for labels, types of available printers at repair centers 12 and print centers 16 and other necessary configuration data.

Vehicle manufacturer user interface 34 provides an interface by which vehicle manufacturers 14 remotely manage label data associated with their respective vehicles. For example, vehicle manufacturers 14 may interact with vehicle manufacturer user interface 34 to upload label data from one or more databases. In addition, vehicle manufacturers 14 may schedule periodic synchronizations to be automatically performed via API 36. Alternatively, vehicle manufacturers 14 may interact with vehicle manufacturer user interface 34 to specify parameters by which CLD management system 10 may dynamically retrieve label data in real time from vehicle manufacturers 14 when requested by repair centers 12.

Vehicle manufacturer user interface 34 stores the label data 42B in database servers 40. Label data 42B includes text, graphics, bar codes or other data associated with original vehicle labels as uploaded or otherwise received from vehicle manufacturers 14. Label data 42B may include a complete image for each label. Alternatively, or in addition, label data 42B may include the constituent elements of a graphic file necessary to regenerate the repair label, and each element may comprise textual data or graphical data. Examples of textual elements include vehicle-specific manufacturing information, warnings, vehicle or part specifications, and the like, or any other text that is typically included on an original vehicle label. Graphical elements may include vehicle-specific or manufacturer-specific graphics, such as instructional graphics, trademarks, logos and other imagery, and may be stored as, for example, individual image files stored in any of a number of formats including JPEG, TIFF, GIFF, PDF and the like.

Label data 42B may also include additional information, e.g., in the form of metadata, that describes each label uploaded by vehicle manufacturers 14. For example, the metadata may describe the composition of each label, including the arrangement of the elements that formulate each vehicle label. As a result, label data 42B allows CLD management system 10 to reassemble the textual and graphical elements, including retention of the original properties of the elements, to produce replacement labels for printing by repair centers 12 or print centers 16. The stored metadata may conform to a data description language, such as the eXtensible Markup Language (XML), or the like.

Repair center user interface 32 provides an interface with which authorized users 23 or automated software of repair centers 12 interact to securely obtain replacement vehicle labels. Repair center user interface 32 allows users 23 to search and easily identify labels based on manufacturer, make and model of vehicle, parts to which the labels are to be affixed, date of manufacturer of the vehicle and other relevant search criteria. Further, repair center user interface 32 allows users 23 to initiate reprinting of the labels at CLD management system 10 or at printers within repair centers 12 or print centers 16. Alternatively, users 23 may issue electronic communications to submit label requests by way of facsimile, telephone using automated menu systems or voice recognition technology, or other techniques.

Print control interface 37 controls output of label data for printing. In some embodiments, print control interface 37 allows a thumbnail or other reduced image of the requested label to be previewed before print. Once a user or client software has interacted with repair center user interface 32 to select one or more labels, print control interface 37 outputs an electronic label record via network 11 for printing at repair centers 12 or print centers 16. A print server or other computer at repair center 12 or print center 16 may receive the label data and control printing of the label on the output device. Alternatively, print control interface 37 may remotely control the output device. The label data may have embedded access rights so that only the authorized repair center or print center that requested the label data is able to print a new vehicle label from the label data. In these embodiments, client software executing on a device associated with the requesting repair center processes the label data and enforces the access rights.

In one embodiment, print control interface 37 requires an acknowledgement from the requesting repair center 12 or print center 16 that the new vehicle label has been successfully received from CLD management system 10 and printed on an output device. Upon receiving the acknowledgement, print control interface 37 marks the original request as complete and prevent additional prints until a new request is received and validated. Further, print control interface 37 may output the label data to include expiration data that specifies a date and time period through which the new vehicle label may be printed. The client software executing associated with the requesting repair center processes may allow only a single, successful print of the replacement label during the defined time period, and may require that any additional prints require additional authorization from CLD management system 10.

In some cases, only labels having an "approved" status from vehicle manufacturer 14 are available to repair centers 12. This gives vehicle manufacturers 14 the ability to manage label data 42B, add new labels, and update labels within label data 42B without concern about the possibility that one of repair centers 12 may prematurely use an unapproved label.

Rules engine 38 provides a degree of automated and secure control over the reprinting of original labels by applying label generation rules 42C, which may represent particular constraints specified by a service provider of CLD management system 10 or by vehicle manufacturers 14. For example, vehicle manufacturers 14 may interact with vehicle manufacturer user interface 34 to specify particular rules and other constraints to control the regeneration and printing of labels related to their corresponding vehicles. A host or other service provider associated with CLD management system 10 may also provide a base set of rules. Vehicle manufacturers 14 may interact with vehicle manufacturer user interface 34 to easily augment the rule set provided by the service provider of CLD management system 10. Rules engine 38 controls the reprinting of the selected vehicle labels in view of the rules specified by the service provider and the specific requirements defined by each of vehicle manufacturers 14. Label generation rules 42C may also be used to provide additional security informational in the form of text or a bar code for automatic inclusion within the replacement labels. For example, as further described below, label generation rules 42C may be created to require the capture and storage of tracking data 42D and the inclusion of all or a portion of the tracking data within the reprinted label.

API 36 provides the ability to establish direct connections with external computing devices. API 36 may be used to allow such devices to automatically control CLD management system 10, or for automatically retrieving data from such devices. For example, a front-end module, such as a software module, script or command line interface provided by the remote computing device may communicate with API 36 directly, e.g., bypassing the interfaces presented by other software modules 21. In this manner, the front-end module can automatically interact with CLD management system 10 and thereby access, update and retrieve label data 42B as well as initiate and control print of replacement labels. As a result, API 36 can be useful when connecting to internal systems to upload and synchronize, for example, label data 42B with labeling information from vehicle manufacturers 14. In other words, API 36 also allows CLD management system 10 to directly access external data sources, such as data sources within vehicle manufacturers 14, or vice versa. In addition, API 36 may be used at the time labels are requested to interface with estimating, part ordering or shop management software executing on client devices and automatically provide label data in near real time in response to automated requests.

Fee collection module 39 handles all aspects of invoice and payment processing, including receipt of credit card payments and generation of invoices for payment repair centers 12, print centers 16 and vehicle manufacturers 14. Fee collection module 39 may communicate electronic invoices to the data system of the payors, or may present the electronic invoices via a user interface for approval by authorized users 23 associated with the payors. Upon receiving an approval (e.g., via web servers 20 or directly from the data system of the payor), fee collection module 39 may initiate electronic fund transfers (EFT) from a bank account of the payor to a bank account of the payee for payment of the electronic invoices. For example, fee collection module 39 may initiate an EFT to transfer funds directly from an account of repair centers 12 to accounts associated with CLD management system 10 or accounts of one or more vehicle manufacturers 14 associated with the labels that were printed.

Tracking module 35 maintains tracking data 42D to record information for tracking the reprinting of vehicle labels. For example, tracking module 35 may require that tracking information be added to the label prior to reprinting the label. Example information includes a barcode or other printed code that includes the vehicle identification number (VIN) of the vehicle for which the label was printed. In other embodiments, radio frequency identification (RFID) or other technologies are used to program or otherwise include tracking data within the reprinted vehicle label. Print control interface 37 updates tracking data 42D to record the tracking data, e.g., the VIN of the vehicle being repaired, date, time and location at which the replacement label was printed, the requesting repair center 12 and service representative, the owner of the vehicle being repaired, the corresponding part to which the label is to be affixed, or other useful tracking information.

In some embodiment, CLD management system 10 may archive label data 42B and tracking data 42D to an external data repository 43 for long-term storage. Data repository 43 indexes label data 42 and tracking data 42D and provides an interface by which repair centers 12, vehicle manufacturers 14 and other authorized users, such as legal authorities, access label data 42B and tracking data 42D. For example, vehicle manufacturers 14 may utilize data repository 43 for analysis of long-term repair, recall and warranty claim data.

Figure 4:
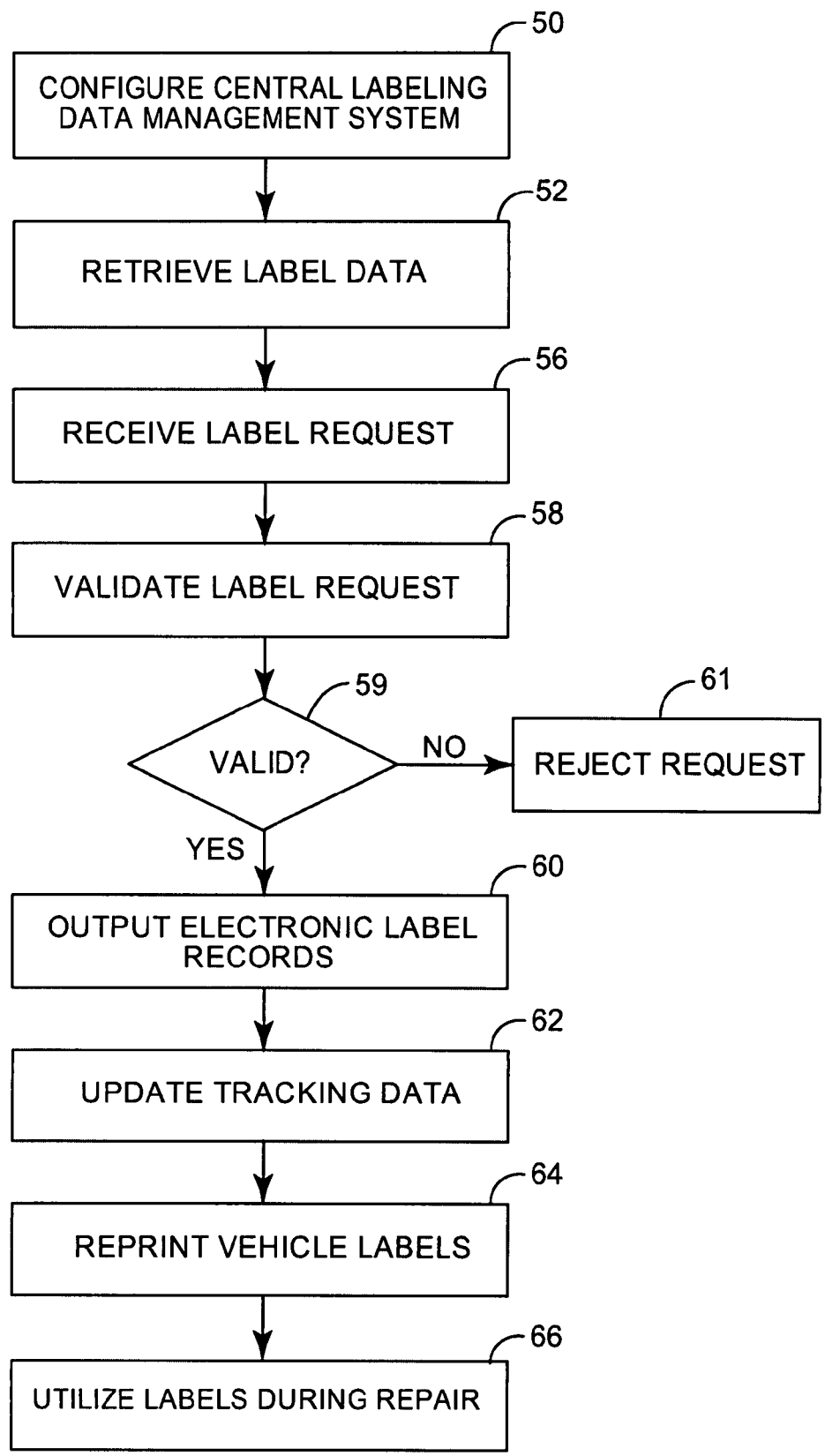
FIG. 4 is a flowchart illustrating example operation of the CLD management system.

FIG. 4 is a flowchart that provides a high-level overview of example operation of CLD management system 10. Initially, a system administrator of a service provider or other host of CLD management system 10 interacts with admin module 30 to configure the CLD management system (50). For example, the authorized user may input configuration data related to new repair centers 12, vehicle manufacturers 14 or print centers 16, setup user accounts, define preferences, access rights, parameters (e.g., network addresses and access information) for communicating with the data centers of the vehicle manufactures, and the like.

Based on this data, CLD management system 10 automatically access and retrieves label data 42B from data sources associated with vehicle manufacturers 14 (52). Alternatively, an authorized user may interact with vehicle manufacturer user interface 34 to specify parameters allowing CLD management system 10 to dynamically retrieve the label data in real time from vehicle manufacturers 14 when requested by repair centers 12.

Next, an authorized user of a repair center 12 accesses CLD management system 10 and initiates the reprinting of an original vehicle label (56). The user may request the printing of one or more labels by directly accessing CLD management system 10, e.g., using a web browser or other software executing on a client computer. Alternatively, access to CLD management system 10 may be transparent to the user. For example, a plug-in or other software module may be incorporated within estimating or part-ordering software to automatically access CLD management system 10 directly of via information provider 19 to request label data for replacement labels.

For authentication purposes, CLD management system 10 may require the user to provide a user identifier (ID) and a password or other security information. In addition, CLD management system 10 may require information (e.g., a VIN) identifying the specific vehicle for which the label is being reprinted, identification of a part to which the label is to be affixed during the repair, a current owner of the vehicle being repaired or other information useful for tracking the reprinted vehicle label.

Upon receiving a label request via repair center user interface 32, print control interface 37 invokes rules engine 38 to validate the security information and ultimately approve the reprinting of the requested labels (58). If the request cannot be validated as a legitimate request by rules engine 38, print control interface 37 directs repair center user interface 32 to reject the request (61). For example, rules engine 38 may reject requests that indicate a pattern of potentially illegal activity. As one example, frequent requests for the same replacement labels designating the same VIN number may result in rejected requests.

If the request is validated by rules engine 38, print control interface communicates electronic label records to the user-selected destination for reprinting the original vehicle label (60). In addition, tracking module 35 updates tracking data 42D to record data provided by the user for purposes of tracking the reprinted vehicle label (e.g., the VIN of the vehicle being repaired, the part to which the label is to be fixed during the repair, and data, time and location of the reprint, and the requesting user and associated repair center) (62).

Tracking module 35 may require that all or a portion of the tracking data be directly printed on the new label. In this case, tracking module 35 directs print control interface 37 to merge tracking data 42D for the print request with label data 42B to generate output data for communication to repair centers 10 or print centers 16 when the vehicle label is reprinted.

Finally, the designated output device (e.g., a printer located at one of repair centers 12 or print centers 16) reprints the vehicle label (64) for application during repair of the vehicle (66).

In one embodiment, the service representative may digitally scan all or a portion of the label to be replaced. Once authorized by CLD management system 10, the service representative may reprint the vehicle label based on the scanned image or have the vehicle label printed at one of print centers 16. Alternatively, CLD management system 10 may use all or a portion of the scanned data (e.g., a portion of the scanned image or a bar code) to automatically retrieve label data 42B corresponding to the original vehicle image.

Figure 5:
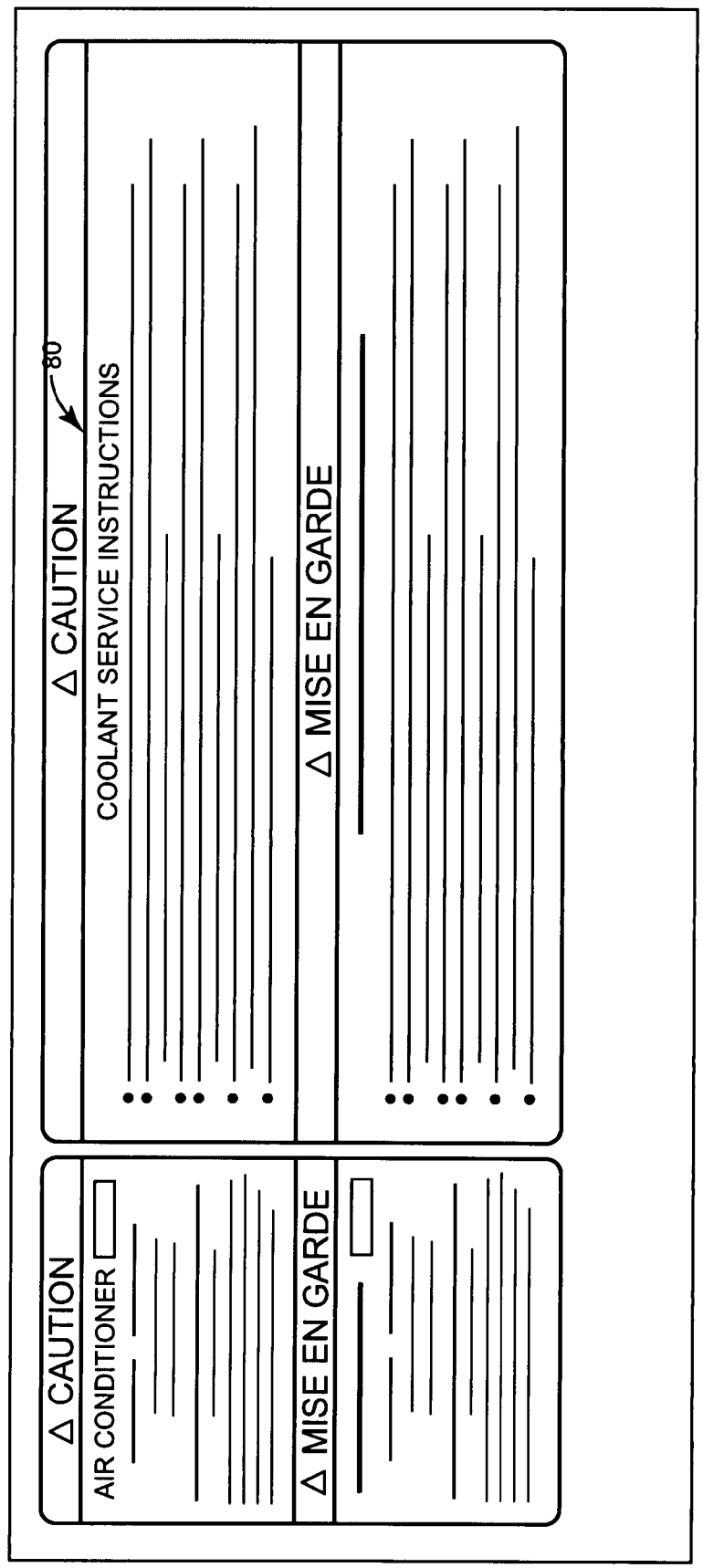
Figure 6:
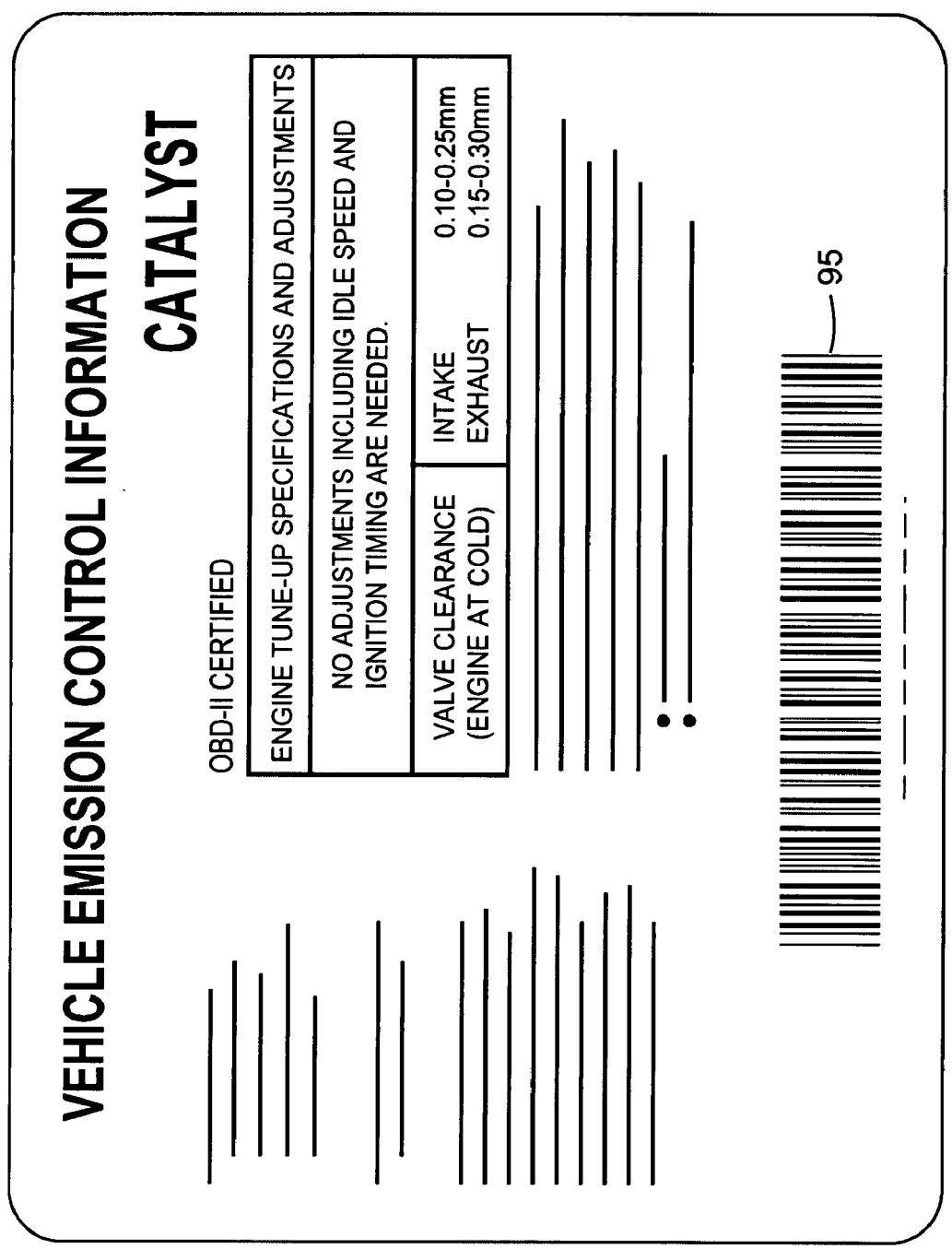

FIGS. 5-7 illustrate example vehicle labels that may be reprinted from CLD management system 10 at the request of repair centers 12. In particular, FIG. 5 illustrates an example coolant and air conditioning warning label 80 typically affixed to coolant mounts within a vehicle. FIG. 6 illustrates an example vehicle emission control information (VECI) label 90. In the example of FIG. 6, VECI label 90 includes bar code 95 that includes tracking data described herein. FIG. 7 illustrates an example information label 100 typically affixed the inside of a door or door jam of a vehicle.

Various implementations and embodiments of the invention have been described. For instance, a CLD management system 10 for aggregating and managing label data for manufactured vehicles has been described. The components of the system may be implemented as server-side components, client-side components, or a combination thereof.

Moreover, although shown as a separate, stand-alone computing system, the functions of CLD management system 10 could be integrated within computing systems provided by information provider 19 or any of vehicle manufacturers 14.

It is understood that various modifications can be made without departing from the invention. Accordingly, these and other embodiments are within the scope of the following claims.

What is claimed is:

1. A computer-implemented method comprising:
    receiving an electronic communication from a client computing device associated with a repair shop, wherein the electronic communication includes a request for label data associated with an original vehicle label;
    retrieving the requested label data from a database that stores label data for a plurality of vehicles produced by a plurality of different manufacturers; and
    electronically communicating the label data for printing a new vehicle label on an output device for use by the repair shop.

2. The method of claim 1, further comprising generating tracking data in response to the request.

3. The method of claim 2, further comprising including the tracking data within the new vehicle label used by the repair shop.

4. The method of claim 3, wherein including tracking data comprises merging the tracking data with the label data and communicating merged data for printing on the output device.

5. The method of claim 2, wherein the tracking data identifies the repair shop requesting the label data for the original vehicle label.

6. The method of claim 2, wherein the tracking data includes a vehicle identification number (VIN) of the vehicle for which the label was printed.

7. The method of claim 2, wherein the tracking data includes:
    a date, time or location at which the label was reprinted,
    an owner of the vehicle being repaired, or
    a part to which the label is to be affixed during the repair.

8. The method of claim 1, further comprising printing the vehicle label with the output device.

9. The method of claim 1, wherein the output device is a label printer or a general-purpose printer.

10. The method of claim 1, wherein electronically communicating the label data comprises communicating the label data to a print center via a network.

11. The method of claim 1, further comprising requiring an acknowledgment message indicating the new vehicle label was successfully printed.

12. The method of claim 1, further comprising embedding access rights within the label data that control access to the label data by an authorized user for printing the new vehicle label.

13. The method of claim 1, wherein electronically communicating label data comprises securely communicating the label data via encrypted messages.

14. The method of claim 1, further comprising executing software instruction to automatically compute fees shared between a service provider of the database and the manufacturers.

15. A system comprising:
    a database that stores label data for a plurality of vehicles produced by a plurality of different manufacturers; and
    a computing system executing:
        software that receives an electronic communication from a client computing device associated with a repair shop, wherein the electronic communication includes a request for label data associated with an original vehicle label, and
        software that retrieves the requested label data from the database and communicates the label data for printing a new vehicle label on an output device for use by the repair shop.

16. The system of claim 15, wherein the computing system executes tracking software that generates tracking data to be associated with the new vehicle label in response to the request.

17. The system of claim 16, wherein the tracking data includes a vehicle identification number (VIN) of the vehicle for which the label was printed.

18. The system of claim 16, wherein the tracking software merges the tracking data with the label data to produce data for printing the vehicle label.

19. The system of claim 16, wherein the tracking data identifies the repair shop requesting the label data for the original vehicle label.

20. The system of claim 16, wherein the tracking data includes:
    a date, time or location at which the label was reprinted,
    an owner of the vehicle being repaired, or
    a part to which the label is to be affixed during the repair.

21. A system comprising:

a computer associated with a repair shop, wherein the computer executes software that presents an interface for receiving information specifying a part for use during repair of a vehicle, and wherein the software automatically prompts a user to order one or more replacement vehicle labels based on the specified part.

22. The system of claim 21, wherein the software comprises estimating software, repair shop management software or part-ordering software.

23. The system of claim 22, further comprising:

a database that stores label data for a plurality of vehicles produced by a plurality of different manufacturers, wherein the software accesses the database to identify the labels associated with the specified part and to determine part numbers associated with the labels.

24. The system of claim 22, wherein software executing on the client computer automatically creates an electronic order for the labels and sends the electronic order to a central label data (CLD) management system associated with the database.

25. The system of claim 24, wherein the CLD management system comprises:

an interface to receive the electronic order from the computer; and a print control interface that retrieves the requested label data from the database and communicates the label data for printing a new vehicle label for use by the repair shop.

* * * * *